Sept. 20, 1927.

E. T. PARSONS 1,642,693

EXTENDER ATTACHMENT FOR DOUGH MOLDERS

Filed July 7, 1926

INVENTOR
Edward T. Parsons,
BY
Everett H. Cook,
ATTORNEYS.

Sept. 20, 1927.  
E. T. PARSONS  
1,642,693  
EXTENDER ATTACHMENT FOR DOUGH MOLDERS  
Filed July 7, 1926  
2 Sheets-Sheet 2
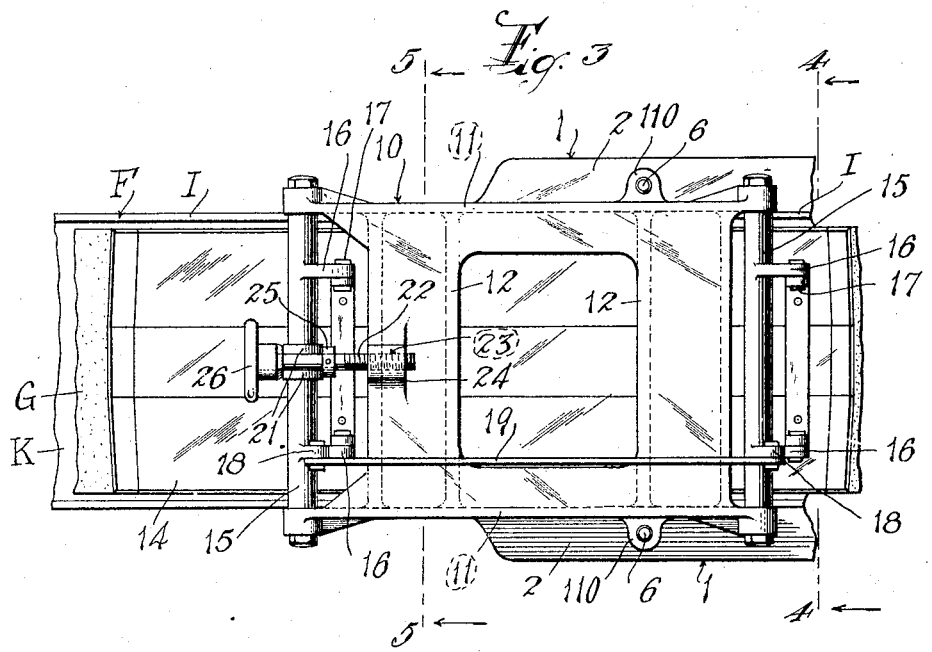
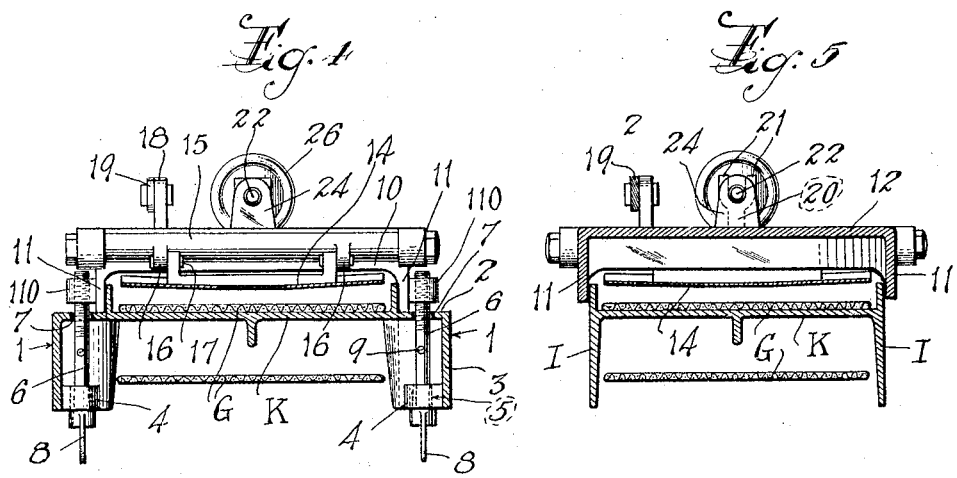
INVENTOR  
Edward T. Parsons,  
BY  
Everett Rook,  
ATTORNEYS.

Patented Sept. 20, 1927.

1,642,693

UNITED STATES PATENT OFFICE.

EDWARD T. PARSONS, OF UPPER MONTCLAIR, NEW JERSEY, ASSIGNOR TO THOMSON MACHINE COMPANY, A CORPORATION OF NEW JERSEY.

EXTENDER ATTACHMENT FOR DOUGH MOLDERS.

Application filed July 7, 1926. Serial No. 120,882.

This invention relates to an attachment for dough molding apparatus for extending, lengthening or elongating a roll of dough after it has been formed or molded, and more particularly to an extender attachment of the type comprising a traveling belt or other roll conveyor and a compression or pressure plate between which the roll is molded under pressure.

In many instances it is desirable to specially handle or operate upon a roll of dough after it has been molded, for example, to convey it away from the molding machine for convenience in panning, or to extend or elongate the roll or to cut or crease the roll, and it is one practice to deposit the newly molded roll directly from the molding machine upon a traveling belt where the roll is subjected to pressure for extending, or otherwise handled or operated upon.

One object of my invention is to provide a novel and improved roll extender attachment for a dough molding machine which comprises a traveling belt conveyor mounted on a frame secured to the molding machine, and a compression or pressure plate to cooperate with said conveyor belt to exert pressure on a roll as it moves between said plate and the belt, said compression plate being adapted to be easily and quickly separably detachably mounted upon the conveyor frame so that it may be selectively used or placed out of operation and interchangeably used with different conveyors, and whereby the conveyor may serve to cooperate with either said compressor plate or other devices for handling or operating upon a roll of dough.

Another object is to provide an extender attachment of the character described in which the compression plate is mounted in a super-frame constructed to be connected to the frame of the conveyor, and said super-frame and said conveyor frame have co-operating means for securing said frames together in proper relation to enable cooperation of said compression plate and said conveyor belt.

Further objects are to provide a roll extender attachment embodying few and simple and inexpensive parts whereby the attachment may be easily and quickly assembled and placed in operation, and to obtain other results and advantages as may be brought out by the following description.

Referring to the accompanying drawings, in which corresponding and like parts are designated throughout the several views by the same reference characters, Figure 1 is a side elevation of a roll extender attachment embodying the invention, showing the same mounted upon a dough molding machine;

Figure 3 is a top plan view of the attachment as illustrated in Figure 2, and

Figure 1:
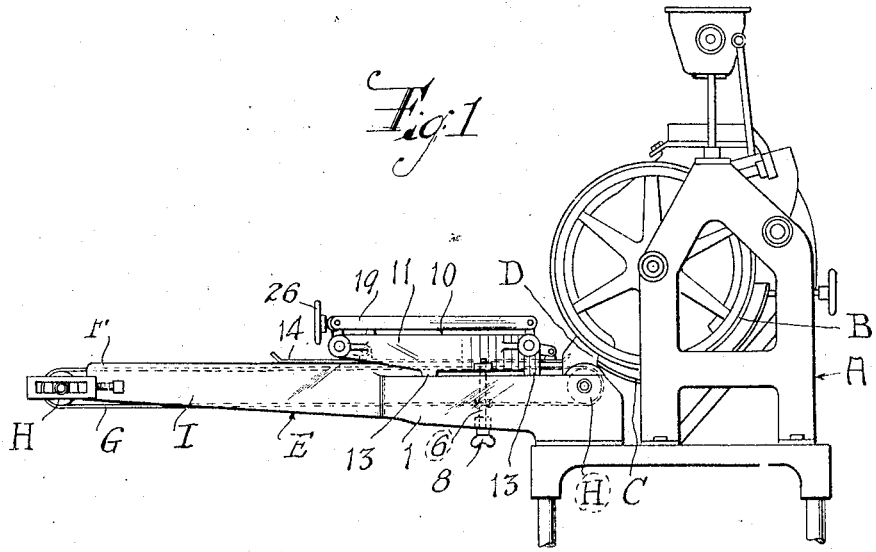
Figure 2:
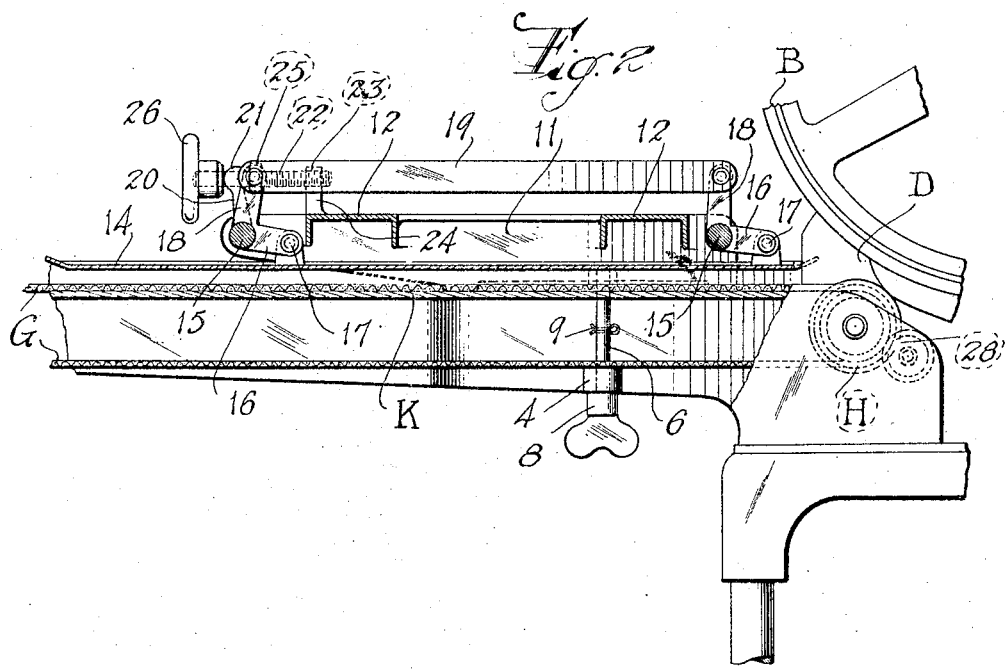
Figure 2 is an enlarged longitudinal vertical sectional view through the attachment.

Figures 4 and 5 are transverse vertical sectional views, taken on the respective lines 4—4 and 5—5 of Fig. 3.

Specifically described the illustrated embodiment of the invention, the reference character A designates a dough molding machine of known type, for example as described in Patent No. 1,542,833 dated June 23, 1925, for forming rolls, and including a kneading drum B and compression plate C between which a lump of dough is molded or shaped into a cylindrical piece and from which said piece is discharged at D. A horizontal conveyor E comprising a frame F and a movable part such as an endless belt G traveling on rollers H is mounted upon the machine A to receive and convey away the roll of dough as it is discharged, said frame F having substantially parallel side pieces I and a table portion K underlying and supporting the upper reach of the belt G. This construction is known in the art and no claim to novelty is made thereon.

The side pieces I of the conveyor frame F are formed on their outer sides with laterally offset portions or projections 1 having substantially horizontal top walls 2 disposed inwardly or downwardly from the top edges of the side pieces. Preferably these offset portions 1 are cast integral with the side pieces I and have side walls 3 on the inner sides of which are provided lugs 4 in spaced relation to the top walls 2 and having openings 5 in which are loosely longitudinally movably and rotatably mounted clamping screws 6. Openings 7 in axial alinement with the respective openings 5 are provided in the top walls 2 and loosely receive the corresponding clamping screws 6 which extend upwardly or outwardly beyond said top walls. The clamping screws 6 have operating heads or wings 8 disposed at the sides of the respective lugs 4 opposite the corresponding top walls 2 and cotter pins or the like 9 are provided in the clamping screws at the other sides of said lugs 4 to limit longitudinal movement of the clamping screws in the openings 5.

A super-frame 10 is provided to be removably or separably mounted upon the conveyor frame F, said super-frame including substantially parallel sides 11 spaced apart a distance greater than the top edges of the side pieces of the conveyor frame and integrally connected by top cross-bars 12. The sides 11 are each formed at one edge with foot lugs 13, and the super-frame is adapted to be mounted upon the conveyor frame in straddling and abutting relation thereto with said foot lugs 13 resting against the top walls 2 of the offset portions 1 of the conveyor frame F. The sides 11 are provided with outwardly projecting lugs 110 having threaded openings to receive the clamping screws 6, and obviously by fitting said screws into said openings and tightening the screws, the super-frame will be firmly but separably secured to the conveyor frame.

A compression plate 14 is mounted in the super-frame 10 so as to be in spaced and substantially parallel relation to the upper reach of the conveyor belt G. Preferably a pair of rocker bars 15 are journaled in the sides 11 and adjacent the ends of the super-frame and extend transversely thereof, and each of said rocker bars has a pair of integral arms 16 pivotally connected at 17 to the compression plate. Each rocker bar 15 also has another arm 18 disposed at an angle to the respective arms 16, and said arms 18 are connected together by a link 19, whereby rocking of either rocker bar causes corresponding and simultaneous rocking of the other rocker bar so as to move the compression plate 14 toward or from the conveyor belt G. One of the rocker bars 15 is also provided with another arm 20 at an angle to the respective arms 16 and bifurcated at its end as at 21. An adjusting screw 22 has one end screw threaded and fitted into a correspondingly threaded opening 23 in a lug 24 on one of the top cross-bars 12, said screw passing between the arms of the bifurcated end 21 of the arm 20 and having a collar 25 fast thereon arranged at one side of said arm 20 and a hand wheel 26 disposed at the other side of said arm so that rotation of said screw 22 causes longitudinal movement thereof and rocks said rocker bars 15, whereby the compression plate 14 may be easily and accurately adjusted relatively to the upper reach of the conveyor belt G.

In operation of the device, a cylindrical roll of dough is deposited upon the upper reach of the conveyor belt G from the dough molding machine and moved longitudinally of the conveyor into the space between the conveyor belt and the compression plate 14, the conveyor being driven in any suitable manner as from the dough molding machine through gearing 28. The compression plate is adjusted by the hand wheel 26 to exert pressure upon the roll of dough whereby the roll is extended or elongated. Obviously the amount of pressure exerted on the roll is variable by the hand wheel 26, and if desired the compression plate can be so adjusted away from the conveyor belt as not to act upon the dough.

The super-frame and compression plate are easily and quickly removable from the conveyor frame F and can be interchangeably and selectively used with a number of dough handling machines; and the conveyor may be used for any other purpose than co-operating with the compression plate for example as a panning conveyor.

While I have described the invention in connection with one type of dough conveyor or handling machine and as embodying certain details of construction, the invention is susceptible of use with other types of machines having a frame and a movable part for moving a roll of dough through the machine, and said details of construction may be modified by those skilled in the art without departing from the spirit or scope of the invention. Therefore, I do not desire to be understood as limiting myself except as required by the following claims when construed in the light of the prior art.

Having thus described the invention, what I claim is:

1. The combination of a dough handling machine including a frame having spaced and substantially parallel side pieces and a movable part between said side pieces to move a roll of dough along said frame, a loaf extender super-frame having side pieces to removably abut said side pieces of the first-mentioned frame, a compression plate mounted on said super-frame between said pieces thereof and in spaced and parallel relation to said movable part, said plate being movable toward and from said movable part whereby a roll of dough may be moved between said compression plate and said movable part and said plate may exert pressure on said roll, said side pieces of said frame and said super-frame having cooperating thumb screws and screw threaded recesses to fasten said super-frame upon said frame, and means on said super-frame for actuating said compression plate.

2. The combination of a dough handling machine including a frame having spaced and substantially parallel side pieces and a movable part between said side pieces to move a roll of dough along said frame, a loaf extender super-frame having side pieces to removably abut said side pieces of the first-mentioned frame, a compression plate mounted on said super-frame between said side pieces thereof and in spaced and parallel relation to said movable part, said plate being movable toward and from said movable part whereby a roll of dough may be moved between said compression plate and said movable part and said plate may exert pressure on said roll, said super-frame having screw threaded openings, thumb screws mounted in said frame to separably engage said openings for fastening said super-frame upon said frame, and means on said super-frame for actuating said compression plate.

3. The combination of a dough handling machine including a frame having spaced and substantially parallel side pieces and a movable part between said side pieces to move a roll of dough along said frame, said side pieces having lateral projections on their outer sides to support a loaf extender, a loaf extender super-frame having side pieces to separably abut said projections and cross bars connecting said side pieces whereby said super-frame straddles said movable part, a compression plate mounted on said super-frame between said side pieces thereof and in spaced and parallel relation to said movable part, said plate being movable toward and from said movable part whereby a roll of dough may be moved between said compression plate and said movable part and said plate may exert pressure on said roll, cooperating separable fastening means on said projections on said frame and said side pieces of said super-frame for quickly removably securing said super-frame upon said frame, and means on said super-frame for actuating said compression plate.

4. The combination with a dough handling machine including a frame having spaced and parallel side pieces and a traveling conveyor belt between said side pieces to move a roll of dough, of a loaf extender attachment comprising a super-frame including spaced and parallel side pieces formed at corresponding edges to separably abut said side pieces of said dough handling machine, and cross bars connecting said side pieces, a compression plate, means for mounting said compression plate in a plane substantially parallel to said traveling belt to move toward and from said belt so that a roll of dough may be moved beneath said plate and said plate may exert pressure on said roll, means for actuating said compression plate, and means for removably securing said super-frame upon said dough handling machine frame including quickly separable cooperating fastening elements upon said super-frame and said dough handling machine frame.

EDWARD T. PARSONS.